Patented Feb. 23, 1937

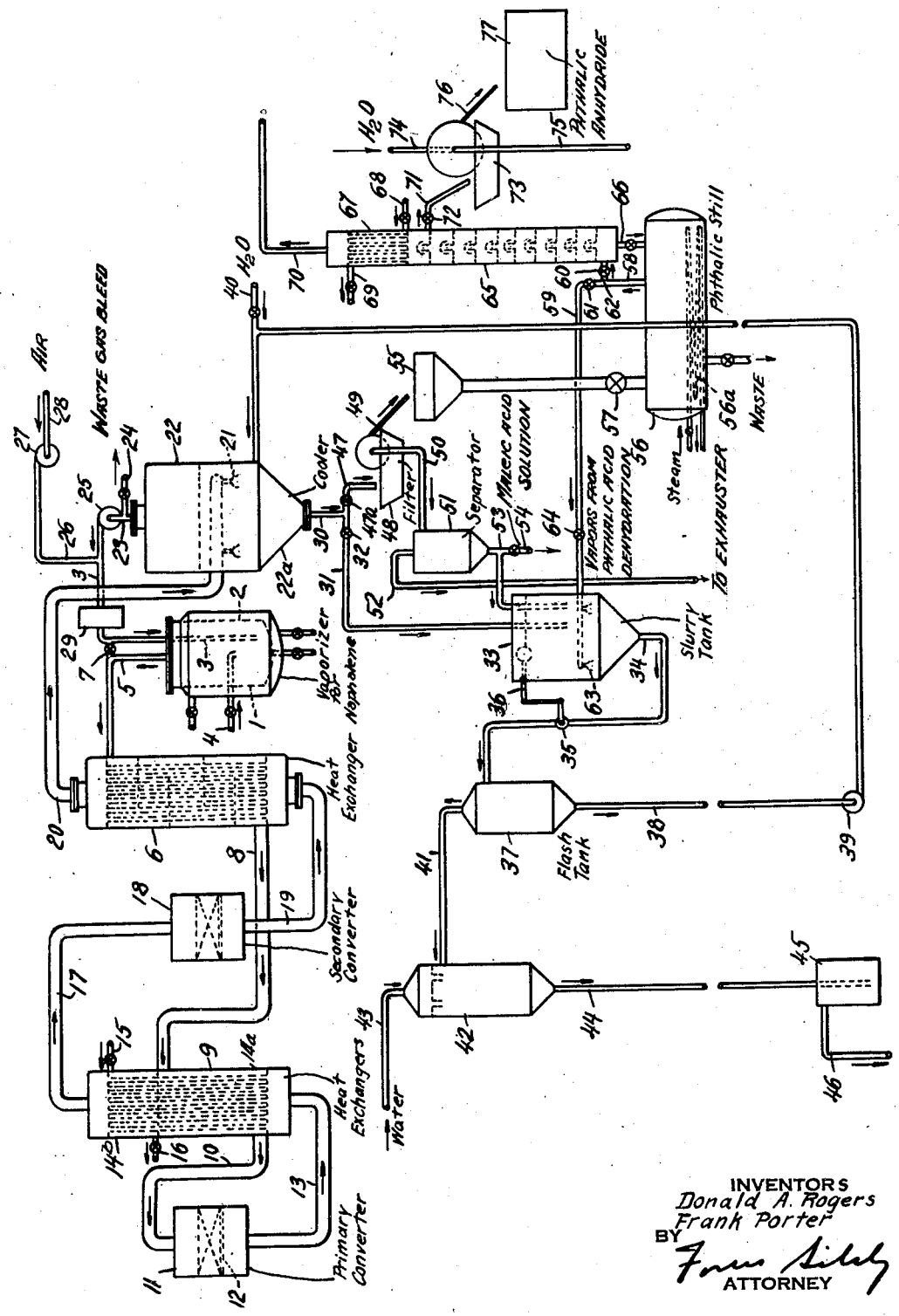

2,071,361

UNITED STATES PATENT OFFICE 2,071,361

CATALYTIC OXIDATION OF NAPHTHALENE

Donald A. Rogers, Petersburg Va., and Frank Porter, Syracuse, N. Y., assignors, by mesne assignments, to The Solvay Process Company, New York, N. Y., a corporation of New York Application August 22, 1935, Serial No. 37,360

12 Claims. (Cl. 260—123)

This invention relates to the oxidation of naphthalene to produce partial oxidation products such as phthalic anhydride and maleic anhydride.

In the catalytic oxidation of naphthalene to partial oxidation products, as practiced prior to the present invention, the naphthalene is vaporized and the vapors are mixed with air or an equivalent oxidizing gas in a ratio of about one part by weight of naphthalene to 25 parts or 35 parts by weight of the oxidizing gas (representing a molar or volume ratio of from about 1:110 to 1:160). The mixture is passed at a temperature of from 200° to 350° C. into a catalyst bed containing an oxidation catalyst such as vanadium oxide ($V_2O_5$). Normally the oxidation catalyst is disposed on a suitable carrier to increase its contact area and avoid packing.

While a high temperature, say about 500° C., should be maintained in the converter to insure the desired oxidation, the maximum temperature at which a commercially satisfactory yield of phthalic anhydride is obtained is about 600° C. At higher temperatures further oxidation is effected in marked degree converting the phthalic anhydride to carbon dioxide and water and very materially reducing the output of desired product. Because of the exothermal character of the oxidation reaction, the temperature of the mixture passing through the catalyst bed is rapidly raised and if some adequate cooling means were not provided, would greatly exceed the maximum temperature desired. Accordingly the converter is generally designed as a heat exchanger providing extensive cooling area and the catalyst bed is cooled by indirect heat exchange with a cooling medium.

The gas and vapor mixture resulting from the above catalytic oxidation step is at a temperature in the neighborhood of 450° or 550° C. and contains phthalic anhydride and by-products, f. i. maleic anhydride, nitrogen, carbon dioxide, water, and perhaps coumarin and naphthoquinone formed as intermediate oxidation products. Accordingly the reaction gases are subjected to some sort of cooling process to remove condensable reaction products.

Maintenance of the requisite reaction temperature during oxidation by indirect cooling depends upon interchange of heat through the walls of the catalytic converter, and it is difficult to obtain uniform temperature conditions throughout the catalyst bed. If temperature conditions are not uniform, some portions of the bed may reach a temperature substantially in excess of that desired, resulting in increased total oxidation of the hydrocarbon and reduced yields of partial oxidation products. If it is attempted to increase the yields of partial oxidation products by maintaining the catalyst bed at a temperautre substantially below the desired maximum, portions of the catalyst bed may be overcooled so that substantial quantities of intermediate oxidation products are obtained in the final product. Thus substantial quantities of naphthoquinone and coumarin are recovered from the reaction gases. In view of the close similarity of the physical properties of these compounds to those of phthalic anhydride, it is exceedingly difficult to effect their separation from the final phthalic anhydride product.

It is an object of the present invention to overcome these disadvantages and not only to obtain high yields of the desired partial oxidation products, but at the same time to obtain these products free from naphthoquinone and coumarin impurities.

As indicated above, in the catalytic oxidation of naphthalene as normally carried out, a weight ratio of naphthalene to air of around 1:30, which corresponds to an amount of air substantially in excess of the theoretical amount necessary for oxidation of naphthalene to phthalic anhydride, is employed. It might be supposed that by reducing the proportion of air, overoxidation could be prevented. Such a process, however, is open to at least two serious objections. In the first place, sufficient reduction of the quantity of air employed to exert a substantial effect on the total oxidation of naphthalene results in the formation of explosive mixtures. Employment of such mixtures in commercial operations would present such a hazard that its use could not be countenanced. In the second place, such reduction in the proportion of air would result in the formation of greater quantities of intermediate oxidation products such as naphthoquinone and coumarin and thus the purification process would be further complicated.

It has now been found that not only may the cooling difficulties encountered in the process above outlined be avoided, but high yields of phthalic anhydride may be obtained substantially free from imurities such as naphthoquinone and coumarin by employing the naphthalene in an oxidizing gas mixture in a molar ratio of less than about 1:200,—that is, the hydrocarbon vapor is mixed with more than about 45 or 50 times its weight of another gas or gases, including the oxidizing constituent, before being introduced into the converter. The term "oxidizing gas" as used herein denominates a gas consisting of or containing oxidizing constituents, thus oxygen, air, or oxygen mixed with any inert diluent is covered by this term.

The required ratio of naphthalene to oxidizing gas may be obtained in several ways. The quantity of air mixed with the naphthalene vapors may merely be increased to about double that normally employed. In this case it might be supposed that the increased quantity of oxidizing gas present would serve to further oxidize phthalic anhydride to carbon dioxide and water. However, it has been found that such is not the case and that although the ratio of oxygen to hydrocarbon is increased, nevertheless the increased quantity of air in the reaction mixture alters other factors in the reaction process and inhibits oxidation to a degree beyond that necessary for formation of phthalic anhydride. As a second method of carrying out the process, a portion of the tail gases may be recirculated in sufficient quantity to increase the total amount of gas present to more than 45 or 50 times the amount of naphthalene in the mixture. Other inert gases may, of course, be employed for effecting this dilution with a corresponding result.

By reduction of the naphthalene content as mentioned above a sufficient volume of gas is provided in the converter so that the heat of the reaction is dissipated in raising the temperature of the gas mixture, and it is possible to carry out the catalysis substantially adiabatically, i. e. without substantial heat loss other than the normal radiation, conduction, and convection losses to the atmosphere. The temperature of the catalyst is in this way maintained below the maximum reaction temperature desired even without any further cooling of the bed at all. Thus with a catalytic converter operating adiabatically a mixture of air and naphthalene vapor in a weight ratio of 65:1 may be introduced into the converter at a temperature of 325° C. without rise of temperature in the converter above about 550° C. Since the diluent is uniformly mixed with the reacting vapors a uniform cooling effect is exerted on the reaction and no local overheating can result.

In order to provide maximum uniformity of reaction conditions in the converter, it is preferred to provide the walls of the converter with heat insulation to reduce the cooling effect of the surrounding atmosphere and to prevent local cooling of the catalyst near the converter walls. However, by suitable arrangement of the catalyst bed or beds so as to diversify the flow of reacting gases substantially uniform conditions may be obtained in the converter without the application of such insulation and it will be understood that the present invention comprehends such operation. The extent of atmospheric cooling, of course, depends upon the size of the converter, the material of which it is composed, and other factors such as the temperature of the air in contact with it and the extent of circulation of the surrounding air. With oxidation catalysts of relatively low activity a large catalyst contact area must be provided and hence a large converter with correspondingly increased surface area exposed to the surrounding air would be employed. In spite of these possible variations in procedure, it is not necessary to subject the catalyst bed to controlled cooling to maintain the desired temperature since the temperature may be controlled merely by varying the proportion of naphthalene in the reacting gases. Thus, for any specific type of catalyst and for any specific type of converter design uniform temperature conditions may readily be obtained.

In the oxidation of naphthalene by means of air alone a weight ratio of naphthalene to air between the limits 1:45 and 1:110 (representing a molar ratio between 1:200 and 1:500) is ordinarily advantageous. A weight ratio of from about 1:75 to 1:90, or molar ratio from about 1:330 to 1:400, in particular gives optimum conditions when employing a converter in which no substantial heat loss takes place. The optimum naphthalene-air ratio may vary somewhat, depending upon the quality of the naphthalene employed and upon the nature of the gaseous diluent, for example, if tar is present with the naphthalene, the heat generated by the reaction is increased and accordingly the naphthalene:air ratio should be correspondingly decreased to compensate for the additional heat generated. The ratio of naphthalene to oxidizing gas will depend to some extent upon the specific heat of the gas employed. Hence the ratio of naphthalene to oxidizing gas may be varied depending upon the relative proportions of the various constituents in the gas mixture. While this consideration may have some slight effect upon the optimum ratio when a portion of the tail gas is recirculated to obtain the desired dilution, the tail gas would contain not only an increased nitrogen content but generally an increased carbon dioxide content. Since the specific heat of nitrogen is higher and that of carbon dioxide is lower than the specific heat of oxygen, the increased proportion of each of these constituents tends to compensate for the other. The optimum ratio also is affected by the temperature at which the mixture is introduced into the catalyst bed. Thus, while an inlet temperature of 325° C. has been mentioned, lower or higher inlet temperatures may be employed in which case a correspondingly increased or decreased ratio of naphthalene to oxidizing gas should be used. It is preferred to introduce the mixture into the catalyst at a temperature between 300° and 350° C.

In the preferred embodiment of the present invention the tail gases, i. e. the reaction gases from which the desired partial oxidation product has been removed are recirculated. It is preferred, too, to effect the catalytic oxidation at a moderately elevated pressure, say around 2 to 5 atmospheres absolute, although the invention is applicable to processes carried out at pressures higher or lower than these. By recirculation of tail gases and by avoidance of unnecessary pressure drops in the circulation system only a fraction of the power required for compressing air is required for recompressing the gases to the preferred operating pressures and the elevated pressure makes possible a much greater throughput for the apparatus. Not only do the tail gases recirculated perform admirably the function of absorbing the heat of reaction but by their recirculation the amount of gases exhausted to the atmosphere is reduced to only one-third or even less of that exhausted with the usual non-recirculatory systems. Such exhaust gases normally contain some small amounts of acid fumes and the quantity of these fumes will be more or less proportional to the amount of gas exhausted. Hence this fume nuisance is greatly reduced. The fumes exhausted with the gases are still further reduced in the preferred process by the fact that every step of the gas treatment is conducted under pressure and the condensation and elimination of vaporous constituents from the gases is thereby rendered more complete.

Partial oxidation of the hydrocarbon may be partly effected in a primary catalyst bed at normal conversion temperature giving reaction gases substantially free from hydrocarbon but containing intermediate oxidation products, and then completed in a second catalyst bed operating at a lower temperature, i. e. 350° to 450° C. as described in the application of Frank Porter, Serial No. 759,972, filed December 31, 1934. No cooling of either catalyst bed is required.

When the catalytic converter is operated at atmospheric pressure, it has been found that reduction of the oxygen content of the gas employed as the oxidizing medium below about 8% at the outlet end of the converter tends to cause reduction of the catalyst. At pressures of 2 atmospheres absolute or above, however, this reduction does not appear to take place until the oxygen is reduced below 5% at the outlet end of the converter. The pressure may be increased to a very high degree, for example as high as 300 pounds per square inch, if desired. However, increase of pressure above 3 atmospheres absolute tends to narrow the temperature range for optimum yields of phthalic anhydride and therefore at higher pressure more accurate temperature control is required. Special equipment to stand the strain of combined high temperature and high pressure also is required. In view of these considerations the preferred pressure range of the present process is 2 to 5 atmospheres absolute and particularly about 3 atmospheres.

The following description of the preferred embodiment of our invention, apparatus for the operation of which is shown in the appended drawing, serves to further demonstrate the invention.

In the drawing numeral 1 designates a naphthalene vaporizer of any suitable type. The conventional vaporizer is shown having a steam jacket 2, a gas inlet 3 near the bottom thereof and a naphthalene or hydrocarbon inlet 4. Vapor conduit 5 leads from vaporizer 1 to heat exchanger 6, which may be of any suitable construction, providing indirect heat exchange between a pair of gas streams. A valved bypass 7 for gases is provided so that the vapor content of the mixture may be regulated by adding oxidizing gas in the event the gases leaving the vaporizer 1 contain more than the desired ratio of naphthalene vapor to oxidizing gas. From heat exchanger 6, vapor conduit 8 leads to a second heat exchanger 9 of the same or different type. A conduit 10 leads from heat exchanger 9 to a primary converter 11.

Converter 11 may be of any suitable construction arranged for the passage of gases into intimate contact with solid catalyst and may be provided with one or a number of trays 12 for supporting the catalyst bed. The converter, of course, should be designed for operation at the elevated temperature and pressure at which it is preferred to carry out the process. Preferably the walls of the converter are suitably insulated to avoid heat loss and prevent local cooling of the catalyst near these walls. The catalyst within the converter may consist of a bed of crushed alundum or silica brick having disposed thereon vanadium oxide in known manner.

From converter 11, a conduit 13 leads to heat exchanger 9, which serves the dual function of reducing the temperature of the reaction gases and heating the gas passing to the converter.

The heat exchanger 9 is illustrated as composed of two sections, 14a and 14b, although these sections may, of course, be entirely separate heat exchangers. Inlet 15 and outlet 16 are provided for flow of cooling fluid through section 14b of exchanger 9. From section 14b of heat exchanger 9 vapor conduit 17 leads to secondary converter 18 of the same general type as converter 11. This converter has an outlet conduit 19 leading to heat exchanger 6, which, as now will be apparent, serves to transfer heat from the hot reaction gas stream to the cooler gases passing to the converter 11. From heat exchanger 6 vapor conduit 20 leads through a distributor 21 into cooler 22.

Cooler 22 may be of any suitable construction providing intimate contact between hot reaction gases and aqueous phthalic acid slurry. The gas may be bubbled up through a body of liquid as in the case of the device illustrated or alternatively the liquid may be sprayed into the gas or streams of liquid and gas may be passed in intimate relation.

Removal of phthalic anhydride from the reaction gases in the above system takes place in cooler 22 into which aqueous phthalic acid slurry is introduced. This serves not only to cool the gases but to scrub them so that practically all of the phthalic anhydride will be removed therefrom. The phthalic anhydride reacts with the water in the cooler to form phthalic acid. Any maleic anhydride contained in the gases is simultaneously scrubbed out by the water and forms an aqueous maleic acid solution.

As illustrated, the cooling chamber 22 comprises a shell adapted to contain a liquid and having gas outlet conduit 23 at the top thereof and a sloped bottom 22a to permit withdrawal of slurry through outlet conduit 30 without substantial separation of solid from liquid. Inlet conduit 20 is provided with the distributor 21 for uniformly distributing the gases beneath the surface of liquid in the cooler. In some cases it may be desirable to provide insulation or steam jacketing around the exterior of the portions of conduit 20 within the cooler in order to avoid cooling of this conduit to such an extent that phthalic anhydride would condense on the interior surfaces of the conduit and cause clogging.

Gas conduit 23 having a valved bleed line 24 leads to recirculating pump 25, which in turn is connected to gas conduit 3. On conduit 3 a branch conduit 26 from compressor 27 is provided. This compressor serves to introduce oxidizing gas, for example air, into the system through an inlet 28. A preheater 29 may be provided on the inlet line 3 to raise the temperature of entering air sufficiently to avoid cooling naphthalene below its melting point. It will be understood, however, that normally the heat of compression of the gases will be sufficient for this purpose.

From the bottom of cooler 22 an outlet pipe 30 and branch pipe 31 provided with a valve 32 lead to a slurry tank 33 which may to advantage be constructed similar to cooler 22 for reasons to be hereinafter more fully set forth. From tank 33 a liquid withdrawal pipe 34 having a valve 35, which may be controlled by any suitable actuating means to maintain a constant liquid level in the tank, for example a float 36, leads to a flash tank 37. From the bottom of the flash tank 37 a liquid return pipe 38, having a pump 39 thereon, leads to the cooler 22. A suitable water inlet 40 may be provided on line 38. From the top of the flash tank a vapor line 41 leads to a suitable evacuating means which, as shown in the drawing, may be a jet evacuator and condenser 42 having a water inlet 43 at the top thereof and a liquid outlet 44 at the bottom thereof. The outlet 44 may be sufficiently long to permit flow of liquid therethrough in opposition to air pressure or a pump may be provided for drawing it through this line. At the bottom of pipe 44 a liquid seal 45 with outlet 46 for suitable liquid disposal is illustrated.

Outlet conduit 30 from the direct contact cooler 22 is shown provided with a second withdrawal pipe 47 having a valve 47a thereon. Withdrawal pipe 47 leads to suitable separating means, such as a drum filter 48. The drum filter is provided with the customary doctor 49 for scraping solid therefrom and with a liquid outlet 50 leading to a separator 51 for eliminating entrained air. An air line 52 from the separator leads to a suitable exhauster (not shown) for supplying suction to the filter 48. At the bottom of the separator 51 a liquid withdrawal pipe 53, having a valved branch 54, is shown. Pipe 53 leads to the tank 33 for return of liquid from the filter to the cooling system. The branch 54 is a bleed off for maleic acid solution. Doctor 49 of the drum filter is arranged so as to conduct solid phthalic acid to a hopper 55 on the phthalic acid still 56. The hopper 55 may be provided with a suitable star valve 57 or other suitable means for controlling introduction of phthalic acid into the still 56.

The phthalic acid still may be of any convenient construction and is shown as a simple distillation vessel provided with a heating coil 56a. It preferably should be suitably insulated to avoid heat loss and promote uniformity of operation. The still has a vapor offtake 58 with a branch 59 and a branch 60. These branches are equipped with valves 61 and 62. Branch 59 leads to the phthalic acid slurry tank 33 through a suitable distributor 63. The line 59 also may be provided with a check valve 64 for preventing back flow of liquid from the slurry tank to the phthalic acid still. Branch 60 leads to the base of a rectification column 65.

Column 65 may be of any suitable construction, such as a plate column or a bell and tray column, and has at the bottom thereof a valved liquid return line 66 and at the top a suitable heat exchanger 67 which may be provided with a liquid inlet 68 and outlet 69. This heat exchanger may be in the nature of a waste heat boiler, water being introduced at 68 and steam being withdrawn at 69. By controlling the steam pressure, the temperature at the top of the column may be regulated. A vacuum connection 70 is provided at the top of the column. From the top plate of the column a liquid withdrawal line 71 having a valve 72 is provided for the withdrawal of phthalic anhydride. This withdrawal line may lead to apparatus for placing the phthalic anhydride in suitable physical condition for transportation or use or may lead to further purification apparatus as desired. As shown in the drawing, it conducts liquid phthalic anhydride to a flaker 73 having an inlet and outlet 74 and 75 for cooling water and a doctor 76 for scraping solid phthalic anhydride from the drum and conducting it to a storage bin 77.

It will be understood that parts of the equipment, which it is desired to maintain at elevated temperature, may be provided with suitable insulation to avoid excessive heat losses.

For the preparation of phthalic anhydride by the vapor phase catalytic oxidation of naphthalene, the process may be carried out in the above apparatus as follows:

A body of naphthalene is maintained in molten condition in vaporizer 1 by means of heat applied by steam jacket 2. Additional naphthalene is introduced through inlet 4 to compensate for its removal by evaporation. Air is supplied through pump 27, pipe 26, heat exchanger 29, and pipe 3 to vaporizer 1 at a pressure around 3 atmospheres absolute. In the vaporizer 1 it bubbles up through the body of molten naphthalene and absorbs vapors therefrom. The resultant naphthalene-air mixture passes out from vaporizer 1 through conduit 5. Additional hot air may be introduced through by-pass 7 so as to reduce the naphthalene to air ratio to between 1 : 330 and 1 : 400. The resultant mixture, which may be at a temperature around 80° C., passes through conduit 5 to heat exchanger 6 where it is heated by indirect heat exchange with hot reaction gases to a temperature around 330° to 400° C.

It may be noted here that in beginning operation of the above apparatus, air may be preheated in heater 29 to a high temperature say around 300° C., until a supply of hot reaction gases is available as the source of heat.

The hot reaction mixture passes from heat exchanger 9 through conduit 10 into primary converter 11, which may contain a vanadium oxide catalyst supported on a tray 12, for example a catalyst composed of about 10 parts of vanadium oxide disposed on 90 parts of crushed silica brick.

In the catalytic converter the naphthalene is oxidized to phthalic anhydride with resultant rise of the temperature of the reaction mixture to between 525° and 550° C. The catalytic converter is operated adiabatically, i. e. without any substantial heat flow thereto or therefrom except that introduced or withdrawn by the gas stream and the temperature regulation is secured by controlling the ratio of naphthalene to entering gases.

The hot reaction gases are withdrawn from the primary converter and passed through conduit 13 to section 14a of heat exchanger 9 where they give up a portion of their heat to ingoing naphthalene air mixture. From this section of the heat exchanger they pass through a second section 14b in which any suitable cooling means is provided and by which their temperature is regulated to between about 400° and about 450° C. At this temperature they pass into secondary converter 18 which may contain a bed of oxidation catalyst similar to that in the preliminary converter and in this converter any naphthoquinone produced by the preliminary oxidation is converted to phthalic anhydride.

The reaction gases are withdrawn from secondary converter 18 at a temperature around 430° to 480° C. and are passed through conduit 19 into heat exchanger 6 where they are cooled by indirect heat exchange with ingoing naphthalene air vapor mixture to a temperature around 200° C. At this temperature the reaction gases, still containing in vapor phase the phthalic anhydride product of the oxidation, pass through conduit 20 and distributor 21 into cooler 22 at a point well below the surface of a body of phthalic acid slurry in water containing around 15% to 30% of solid phthalic acid as crystalline slurry and maintained at a temperature between about 50° C. and about 60° C. The gases bubble up through the body of liquid and are cooled thereby to about the temperature of the cooling liquid. Phthalic anhydride reacts with the water to form phthalic acid and is retained in the cooling liquid in crystalline form. Any maleic anhydride or maleic acid present in the gases is simultaneously absorbed or dissolved and retained in the solution.

The gases freed from phthalic anhydride and maleic anhydride or maleic acid pass through outlet conduit 23 while yet at a pressure above about two atmospheres absolute, and are recirculated by means of pump 25 to the naphthalene vaporizer 1. After the recirculation of gases is under way a portion thereof is bled off at 24 and a corresponding portion of air is introduced through inlet 28 by means of air compressor 27.

The pressure of the gases in the system is preferably maintained so that the gases pass through the catalytic converter at around 3 atmospheres absolute pressure, and preferably pressure losses in the system are minimized so that a reduction of pressure of only a few tenths of one atmosphere takes place through the entire system. The ratio of additional air to recirculated gas may be varied within wide limits. It is preferred, however, to adjust the bleed off of tail gas at 24 and the introduction of additional air at 28 so as to maintain an oxygen content of between 5% and 10% by volume in the gases leaving converted 18 and the additional air supplied may be only about 1/6th to 1/5th of the total volume of gases passing through the converter.

It will, of course, be noted that although the reaction mixture passing through the primary converter has been referred to as a mixture of naphthalene and air, once the apparatus is in proper operation, the mixture will comprise a small portion of added air and a relatively large portion of tail gases which in addition to oxygen and nitrogen will contain gaseous products of the reaction.

Phthalic acid slurry is withdrawn through outlet pipe 30 and pipe 31 to the tank 33 and passes thence through pipe 34 to flash tank 37 maintained under vacuum by means of the jet evacuator 42. Resultant evaporation of water from the solution may cool the slurry to around 20° to 40° C. and this cooled slurry is returned via pipe 38 to the body of liquid in cooler 22 where it mingles with the slurry contained therein. The amount of liquid passing through this circuit may be controlled by the pump 39 so that a substantially constant temperature of about 50° C. to 60° C. is maintained in the body of liquid in cooler 22. A small portion of the liquid withdrawn through outlet 30, say 1% to 5% thereof, is withdrawn through outlet pipe 47 to a drum filter 48 where liquid is separated from solid by suction, liquid passing through pipe 50 to air separator 51. The suction is maintained on the filter by an exhauster, not shown, connected to line 52. The main portion of this liquid, free from solid phthalic acid, is returned via pipe 53 to the tank 33. A minor portion thereof may be bled off through bleed line 54 for recovery of maleic acid from solution or for other suitable disposal, the amount of bleed being controlled so that maleic acid will not be present in the solution or slurry in cooler 22 in sufficient quantity to exist in solid phase under the conditions of filtration. Solid phthalic acid collects on the drum filter and is scraped therefrom by doctor 49 and conducted to hopper or bin 55 from whence it may be passed through valve 57 into a phthalic acid still 56.

The still illustrated is designed for intermittent operation and the hopper 55 provides storage for phthalic acid while a preceding charge is being treated in the still. When sufficient phthalic acid has been introduced into still 56 to constitute a charge therefor, the introduction of additional acid through valve 57 is discontinued and steam is passed through coil 56a to dehydrate the phthalic acid. During this operation the valves on lines 60 and 66 are kept closed and valve 61 is opened so that vapors from the still pass through conduits 58 and 59 to distributor 63 within the slurry tank 33. Here the vapors bubble up through the slurry with the result that they are washed free from any phthalic acid which they may contain. When the charge of phthalic acid is completely dehydrated, which may be indicated by rise of temperature in the still appreciably above 190° C. when the still is operated at approximately atmospheric pressure, valve 61 is closed and the valves on lines 60 and 66 are opened so that vapors may pass from the still up through column 65 and reflux liquid may return through 66 to the still. The temperature in the still is then further raised and vacuum is applied through connection 70 to reduce the pressure to around 1.7 pound absolute in the column. Phthalic anhydride vapors pass up through column 65 and are rectified by countercurrent contact with phthalic anhydride condensate formed in the condenser 67. The temperature at the top tray of the column is controlled by suitable adjustment of the cooling fluid in condenser 67 so that a substantially pure phthalic anhydride product may be withdrawn in liquid phase through outlet 71. Thus a temperature of about 200° C. may be maintained at the top of the column and the withdrawal of phthalic anhydride may be regulated so as to provide ample reflux liquid to flow down through the column. The liquid phthalic anhydride withdrawn may be passed to a flaker 73 and cooled and solidified as a film by indirect heat exchange with cooling water passing through the drum of the flaker, the film of phthalic anhydride being scraped from the drum by doctor 76 and conducted to a suitable storage container 77.

We claim:

1. In the preparation of phthalic anhydride by the catalytic oxidation of naphthalene in vapor phase, the improvement which comprises passing a mixture of naphthalene vapor and oxidizing gas in a molar ratio between 1:200 and 1:500 through a catalytic converter containing an oxidation catalyst, and regulating the ratio of naphthalene to oxidizing gas so as to maintain a temperature between 450° and 600° C. in the catalytic converter.

2. In the preparation of phthalic anhydride by the catalytic oxidation of naphthalene in vapor phase, the improvement which comprises passing a mixture of naphthalene vapor and oxidizing gas in a molar ratio between 1:200 and 1:500 through a catalytic converter containing an oxidation catalyst and operated substantially adiabatically, regulating the ratio of naphthalene to oxidizing gas so as to maintain a temperature between 450° and 600° C. in the catalytic converter, withdrawing the hot reaction gases from the converter and cooling them to separate phthalic anhydride, bleeding off a portion of the cooled gases, adding an oxygen-containing gas to the remainder, the oxygen content of said gas being substantially greater than that of said remainder, and using the resultant mixture as the oxidizing gas for converting further quantities of naphthalene to phthalic anhydride.

3. In the preparation of phthalic anhydride by the catalytic oxidation of naphthalene in vapor phase, the improvement which comprises passing a mixture of naphthalene vapor and oxidizing gas in a molar ratio between 1:200 and 1:500 through a catalytic converter containing an oxidation catalyst and operated substantially adiabatically, regulating the ratio of naphthalene to oxidizing gas so as to maintain a temperature between 450° and 600° C. in the catalytic converter, withdrawing the hot reaction gases from the converter and cooling them to separate phthalic anhydride, bleeding off a portion of the cooled gases, adding air to the remainder, using the resultant mixture as the oxidizing gas for converting further quantities of naphthalene to phthalic anhydride, and maintaining the gases throughout the system at a pressure above 2 atmospheres absolute.

4. The method of preparing phthalic anhydride by the catalytic oxidation of naphthalene in vapor form, which comprises preparing a naphthalene-oxidizing gas mixture containing the naphthalene and oxidizing gas in a molar ratio between 1:200 and 1:500, passing the mixture heated to a temperature between 300° and 350° C. into a catalytic converter containing an oxidation catalyst, operating said converter substantially adiabatically, regulating the ratio of naphthalene to oxidizing gas so as to maintain the temperature of the catalyst bed between about 450° and 600° C. whereby the naphthalene is oxidized to phthalic anhydride, withdrawing the hot reaction gases from the converter and cooling them to separate phthalic anhydride, bleeding off a portion of the residual gases, adding air to the remainder, and employing it as the oxidizing gas for oxidation of subsequent portions of naphthalene.

5. In the catalytic oxidation of naphthalene to phthalic anhydride, the improvement which comprises passing a mixture of naphthalene vapors and oxidizing gas through a catalytic converter at an elevated temperature to convert the naphthalene to phthalic anhydride, withdrawing the hot reaction gases from the converter and cooling them to separate phthalic anhydrides, bleeding off a portion of the residual gases, mixing the remainder with air, circulating the resultant mixture in admixture with naphthalene vapor into contact with the oxidation catalyst for effecting oxidation of further quantities of naphthalene, and maintaining a pressure above 2 atmospheres absolute on the gases throughout the system.

6. In the catalytic oxidation of naphthalene to phthalic anhydride, the improvement which comprises passing a mixture of naphthalene vapors and oxidizing gas through a catalytic converter at an elevated temperature to convert the naphthalene to phthalic anhydride, withdrawing the hot reaction gases from the converter and cooling them to separate phthalic anhydride, bleeding off a portion of the residual gases, mixing the remainder with air, circulating the resultant mixture in admixture with naphthalene vapor into contact with the oxidation catalyst for effecting oxidation of further quantities of naphthalene, and maintaining a pressure between 2 and 5 atmospheres absolute on the gases throughout the system.

7. The method of effecting partial oxidation of naphthalene to phthalic anhydride, which comprises passing a mixture of naphthalene vapor and oxidizing gas at a temperature between 300° and 350° C. in a molar ratio between 1:330 and 1:400 at a pressure between 2 and 5 atmospheres absolute into contact with an oxidation catalyst in a converter operated substantially adiabatically, regulating the ratio of naphthalene to air so as to maintain a temperature between 450° and 600° C. within the converter, cooling the hot reaction gases to condense phthalic anhydride therefrom, bleeding off a portion of the residual gases, adding additional air to the remainder, and using the resultant mixture as the oxidizing gas for oxidation of further quantities of naphthalene, said bleed off and air addition being regulated so as to maintain the oxygen content of the gases leaving the converter at 5% to 10% by volume.

8. The method of effecting partial oxidation of naphthalene to phthalic anhydride, which comprises passing a mixture of naphthalene vapor and oxidizing gas at a temperature between 300° and 350° C. in a molar ratio between 1:330 and 1:400 at a pressure between 2 and 5 atmospheres absolute into contact with an oxidation catalyst in a converter operated substantially adiabatically, regulating the ratio of naphthalene to air in the mixture so as to maintain a temperature between 450° and 600° C. within the converter, cooling the hot reaction gases to condense phthalic anhydride therefrom, bleeding off a portion of the residual gases, adding additional air to the remainder, passing the resulting mixture into contact with liquid naphthalene to vaporize the naphthalene and form a naphthalene vapor-oxidizing gas mixture, regulating the naphthalene vapor to oxidizing gas ratio to between 1:330 and 1:400, heating the mixture to between 300° and 350° C., and passing the resultant hot mixture into the converter for the formation of phthalic anhydride.

9. The method of effecting partial oxidation of naphthalene to phthalic anhydride, which comprises passing a mixture of naphthalene vapor and oxidizing gas at a temperature between 300° and 350° C. in a molar ratio between 1:330 and 1:400 at a pressure between 2 and 5 atmospheres absolute into contact with an oxidation catalyst in a converter operated substantially adiabatically, regulating the ratio of naphthalene to air so as to maintain a temperature between 450° and 600° C. within the converter, bringing the reaction gases while yet hot into intimate contact with an aqueous cooling liquid to remove phthalic anhydride, bleeding off a portion of the residual gases, adding additional air to the remainder, using the resultant mixture as the oxidizing gas for oxidation of further quantities of naphthalene, and maintaining the gases under a pressure between 2 and 5 atmospheres absolute throughout the system.

10. In the preparation of phthalic anhydride by the catalytic oxidation of naphthalene in vapor phase, the improvement which comprises passing a mixture of naphthalene vapor and oxidizing gas in a molar ratio between 1:200 and 1:500 through a catalytic converter containing an oxidation catalyst and operated substantially adiabatically, and regulating the ratio of naphthalene to oxidizing gas so as to maintain a temperature between 450° and 600° C. in the catalytic converter.

11. In the preparation of solid phthalic anhydride by the catalytic oxidation of naphthalene in vapor phase, the improvement which comprises passing a mixture of naphthalene vapor and oxidizing gas in a molar ratio between 1:200 and 1:500 through a catalytic converter containing an oxidation catalyst and operated substantially adiabatically, withdrawing the hot reaction gases from the converter and cooling them to separate phthalic anhydride, bleeding off a portion of the cooled gases, adding an oxygen-containing gas to the remainder, and using the resultant mixture as the oxidizing gas for converting further quantities of naphthalene to phthalic anhydride, and regulating the addition of oxygen-containing gas so as to maintain the oxygen-content of gases leaving the converter at least about 5% by volume.

12. In the preparation of solid phthalic anhydride by the catalytic oxidation of naphthalene in vapor phase, the improvement which comprises passing a mixture of naphthalene vapor and oxidizing gas in a molar ratio between 1:200 and 1:500 through a catalytic converter containing an oxidation catalyst without substantial heat loss therein, withdrawing the hot reaction gases from the converter and cooling them to separate phthalic anhydride, bleeding off a portion of the cooled gases, adding an oxygen-containing gas to the remainder, and using the resultant mixture as the oxidizing gas for converting further quantities of naphthalene to phthalic anhydride, and regulating the addition of oxygen-containing gas so as to maintain the oxygen-content of gases leaving the converter at 5% to 10% by volume.

DONALD A. ROGERS.
FRANK PORTER.